UNITED STATES PATENT OFFICE.

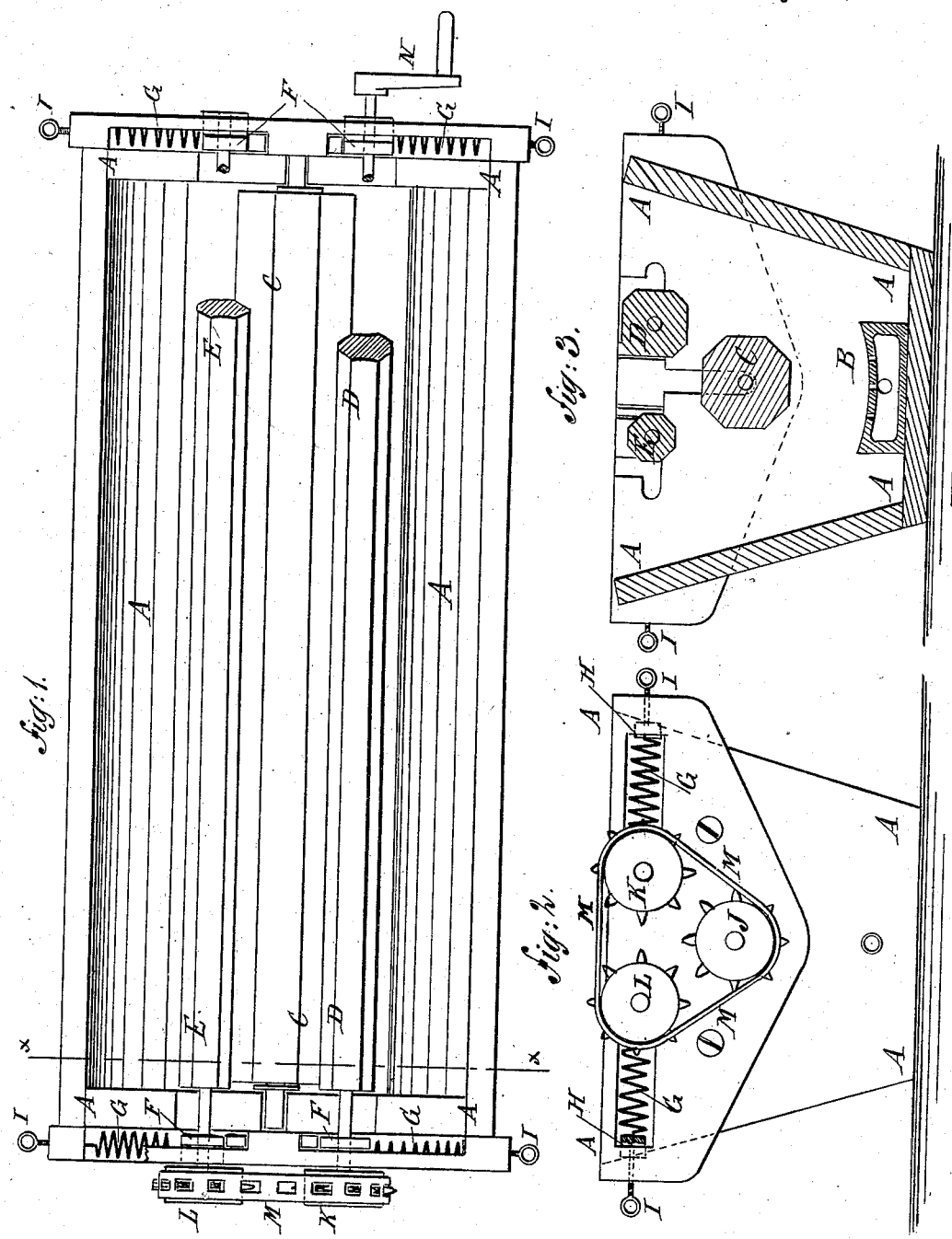

JARVIS C. BRUSH, OF NEWBURG, NEW YORK.

MACHINE FOR FELTING AND SCALDING HAT-BODIES.

SPECIFICATION forming part of Letters Patent No. 261,668, dated July 25, 1882.

Application filed April 17, 1882. (Model.)

*To all whom it may concern:*

Be it known that I, JARVIS C. BRUSH, of Newburg, in the county of Orange and State of New York, have invented a new and useful Improvement in Machines for Felting and Scalding Hat-Bodies, of which the following is a full, clear, and exact description.

Reference is to be had to the accompanying drawings, forming part of this specification, in which similar letters of reference indicate corresponding parts in all the figures.

Figure 1 is a plan view of my improvement, part being broken away. Fig. 2 is an end elevation of the same. Fig. 3 is a sectional end elevation of the same, taken through the line *x x*, Fig. 1.

The object of this invention is to facilitate the operations of felting and scalding hat-bodies.

The invention consists in a machine for felting and scalding hat-bodies constructed with a vat having a perforated steam chest or pipe in its lower part, and provided with polygonal rollers of different diameters connected at one end by chain-wheels and chain, and one or more of the rollers being provided with spring-pressed bearings, whereby the rolled-up hat-bodies will be turned and beaten, as will be hereinafter fully described.

A represents a vat or trough of suitable size. In the lower part of the vat A is placed a steam chest or pipe, B, into which steam is introduced from any ordinary steam-generator, and which has numerous small holes formed in its upper side, from which steam is projected, in fine jets, into the water in the vat A when water is used, and against the hat-bodies when water is not used.

In bearings in the middle parts of the ends of the vat A revolve the journals of a large polygonal roller, C. Above one side of the roller C and at one side of the central line of the vat A is placed a smaller polygonal roller, D, and above the other side of the roller C and at the other side of the central line of the vat A is placed a still smaller polygonal roller, E, a sufficient space being left between the rollers C D E, as shown in Fig. 3, to receive a rolled-up hat-body. The journals of the rollers D E revolve in sliding bearings F, placed in recesses in the ends of the vat A, and held inward by spiral springs G, the inner ends of which rest against the said bearings F. Against the outer ends of the spiral springs G rest blocks H, against the outer sides of which rest the ends of hand-screws I. The screws I pass through screw-holes in the ends of the vat A, or in blocks or nuts attached to the said ends, so that the tension of the springs G can be regulated, as the work to be done may require, by adjusting the said screws. At one end of the vat A the journals of the rollers C D E project, and to them are attached chain-wheels J K L, around which passes an endless chain or belt, M, so that the three rollers will be revolved together. The chain M should be slack; or an elastic belt should be used to give the rollers D E the necessary play.

To the journals of one of the rollers C D E is attached a crank, N, or a pulley, according as the machine is to be operated by hand or by other power.

In using the machine the hat-bodies to be felted or nap hat-bodies to be stuck and scalded are rolled up and placed in the space between the rollers C D E, and the said rollers are revolved. As the rollers C D E are revolved their angular faces acting against the rolled-up hat-bodies causes the rollers D E to have a lateral movement, so that the said rollers will beat and turn the said hat-bodies, and thus quickly bring them to the required condition.

If desired, the lower roller, C, may be replaced by two polygonal rollers placed side by side; or the roller C and one of the rollers D E can be replaced by stationary plane surfaces, which will do the work; but I prefer the construction first described as being more speedy and effective.

I am aware of the Letters Patent granted to C. A. Mallory, dated February 28, 1882, No. 254,349, A. Pelisse, dated February 21, 1882, No. 254,041, and J. Vero, dated February 28, 1871, No. 112,197, and I therefore lay no claim to such inventions.

Having thus fully described my invention, I claim as new and desire to secure by Letters Patent—

1. The combination, with the vat A, provided with the perforated steam-chest B, of the polygonal rollers C D E, the latter, D E, journaled in laterally-yielding bearings, and means, substantially as described, for revolving said rollers, as and for the purpose set forth.

2. The combination, with the vat A, provided with the perforated steam-chest B, of the polygonal rollers C D E, of different diameters, the sliding bearings F, the springs G, the set-screws I, the chain-wheels J K L, and the belt M, substantially as and for the purpose set forth.

JARVIS C. BRUSH.

Witnesses:
HIRAM LOZIER,
WILLIAM F. BRUSH.